United States Patent [19]
Cummings et al.

[11] Patent Number: 6,058,034
[45] Date of Patent: May 2, 2000

[54] CURRENT CONVERTER AND SOURCE IDENTIFICATION AND DETECTION

[76] Inventors: John A. Cummings, 3706 Galena Hills Cove, Round Rock, Tex. 78681; Barry K. Kates, 12100 Metric Blvd., No. 228, Austin, Tex. 78758

[21] Appl. No.: 09/174,955

[22] Filed: Oct. 19, 1998

[51] Int. Cl.[7] .................................................. H02M 7/04
[52] U.S. Cl. .................................................... 363/74
[58] Field of Search .................................. 323/220, 266, 323/273; 363/34, 74, 123; 320/5, 9, 30; 364/707

[56] References Cited

U.S. PATENT DOCUMENTS

| | | | |
|---|---|---|---|
| 4,538,101 | 8/1985 | Shimpo et al. | 323/272 |
| 4,815,106 | 3/1989 | Propp et al. | 375/36 |
| 5,239,495 | 8/1993 | Nanno et al. | 364/707 |
| 5,300,874 | 4/1994 | Shimamoto et al. | 320/15 |
| 5,315,228 | 5/1994 | Hess et al. | 320/31 |
| 5,355,073 | 10/1994 | Nguyen | 320/15 |
| 5,355,077 | 10/1994 | Kates | 323/224 |
| 5,408,669 | 4/1995 | Stewart et al. | 395/750 |
| 5,490,056 | 2/1996 | Iwasaki | 363/97 |
| 5,535,371 | 7/1996 | Stewart et al. | 395/500 |
| 5,625,275 | 4/1997 | Tanikawa et al. | 320/32 |
| 5,636,112 | 6/1997 | Faulk | 363/48 |
| 5,684,382 | 11/1997 | Fritz et al. | 320/5 |
| 5,698,964 | 12/1997 | Kates et al. | 320/22 |
| 5,818,200 | 10/1998 | Cuumings et al. | 320/116 |

*Primary Examiner*—Matthew Nguyen

[57] ABSTRACT

A current converter that includes stored information about the converter can provide that information to an electronic device, such as a computer system, when the current converter is in use with the device. The current converter information can include manufacturer and model identity information, compatibility information, electrical characteristics, current converter type information, and current source information. A storage device in the current converter is coupled to a data bus for connecting to the electronic device, or can make use of one or more of the existing power output terminals to provide current converter information to the electronic device. Based on the information provided to the electronic device, the device can determine whether to allow operation of the device, and if so, under what circumstances and conditions.

27 Claims, 1 Drawing Sheet

6,058,034

CURRENT CONVERTER AND SOURCE IDENTIFICATION AND DETECTION

BACKGROUND OF THE INVENTION

1. Field of the Invention

This invention relates to current sources and converters for electronic devices and particularly to identifying current sources and converters.

2. Description of the Related Art

Electronic devices, and particularly portable electronic devices such as portable computers, cellular telephones, and personal digital assistants (PDAs), typically use current converters to convert electrical current from a current source into a current type (e.g., alternating current (AC) and direct current (DC)), voltage, and/or current that is appropriate for the electronic device's operation. Converters are also used to charge on-board rechargeable batteries. For example, an AC to DC current converter ("AC-DC adapter," "AC adapter," or simply "adapter") typically plugs into a wall outlet and converts the 110–240 volts, 50–60 Hz AC current into a lower voltage DC current for use by an electronic device. Other current converters convert DC currents of one voltage, to a DC current of another voltage. Examples of this type of converter include automobile and airplane adapters that plug into a DC current source in the vehicle, and supply a different DC current (e.g., different voltage) to an electronic device. Still another example of a current converter is a DC to AC converter, or "inverter." Such devices are particularly useful when a user is presented with a DC source, such as the standard cigarette lighter connector in an automobile, but the electronic device to be used already includes an internal AC to DC adapter, such that the device requires AC current as input. Finally, AC to AC converters are also used, for example, to convert the standard AC current of one country to that of another country.

Current converters are commonly provided as a separate module with a plug or cord for connecting the converter to the current source (e.g., automobile cigarette lighter, airline power outlet, or AC wall outlet) and another cord for connecting the converter to the electronic device through a connector. Given the variety of electronic devices that use converters, and the various output polarizations, voltage ratings, and current ratings of those converters, an electronic device user is likely to have several, if not many, different converters for different electronic devices. Consequently, matching the correct converter to the intended device can be difficult because of similarity in appearance among converters and similarity among the connectors associated with the converters. Compounding this problem is the fact that converters intended for different applications can be manufactured by the same company and look the same, yet have dissimilar electrical characteristics.

Using the wrong converter with an electronic device can lead to improper performance of, and damage to, the electronic device. Moreover, using the wrong converter can present a safety hazard (e.g., electrical shock or fire) which can be of even greater concern when the electronic device is being used under extreme temperature conditions, such as in a parked automobile, or when the device is being used in a sensitive environment, such as on-board an aircraft while the aircraft is in flight. For example, use of an incorrect converter to apply current to a portable computer which, in turn, uses the current to charge a rechargeable battery can cause the battery to explode and the portable computer to catch fire. Under normal circumstances, such an event is quite serious, but on board an aircraft in flight, the incident can be life-threatening. Of equal concern is the situation where the correct current converter for the system is used, but the system includes an incorrect or substandard battery. The potential dangers associated with improper charging of batteries on-board aircraft has prompted at least one industry group, the Portable Rechargeable Battery Association, to urge the Federal Aviation Administration (FAA) to prohibit recharging on flights. Additionally, there can be circumstances, such as the in-flight example above, where use of even a proper current converter should be more tightly controlled or even prevented.

Prior methods to prevent improper use of and/or mitigate the damage from improper use of a current converter generally fall into two categories: mechanical methods and electrical methods. The most common mechanical solution to the problem of improper converter use is to provide the converter and the electronic device using the converter with unique connector keying such that the wrong connector cannot be inserted into the electronic device. One drawback to this method of preventing improper use of a converter is that it prevents manufacturers from using standard connectors and converters which allow the manufacturer to avoid the high costs of tooling, testing, and providing a custom part.

Electrical solutions typically include circuitry for clamping the improper input voltage with a dissapative device such as a zener diode, a metal oxide varistor (MOV), or a junction diode. These devices will only work if the input power source has power limiting within the capability of the dissapative device, and thus there ability to protect a device is limited. Such specialized circuits or components add cost and complexity to the electronic device. Additionally, operating conditions within the specification of the dissapative device are not always met, so damage to the electronic device can still result from using an improper converter.

Accordingly, it is desirable to have a current converter that can be identified by an electronic device in order to prevent use of an improper converter with the device. Additionally, it is desirable to have such a current converter that can provide information to the electronic device so that the device can operate more safely and efficiently when a proper current converter is used with the device.

SUMMARY OF THE INVENTION

It has been discovered that a current converter that includes stored information about the converter can provide that information to an electronic device, such as a computer system, when the current converter is in use with the device. The current converter information can include manufacturer and model identity information, compatibility information, electrical characteristics, current converter type information, and current source information. A storage device in the current converter can be coupled to a data bus for connecting to the electronic device, or can make use of one or more of the existing power output terminals to provide current converter information to the electronic device. Additionally, the current converter can allow information from the current source to pass through the current converter to the electronic device, thereby providing additional information about the current source. Based on the information provided to the electronic device, the device can determine whether to allow operation of the device, and if so, under what circumstances and conditions.

Accordingly, one aspect of the present invention provides a current converter. The current converter includes a current input terminal, a current output terminal, and a current converting circuit coupled to the current input terminal and the current output terminal. The converter also includes a converter information storage device. A data bus is coupled to the storage device, and is operable to provide converter information stored in the converter information storage device.

In another aspect of the invention, a computer system includes a processor, a memory coupled to the processor, and power management circuitry coupled to the processor and memory. The power management circuitry is operable to supply power to the processor and memory. The power management circuitry includes a current input terminal, and a controller operable to receive current converter information from a current converter. The controller selectively enables the power management circuitry to deliver power to the processor and memory depending upon the current converter information.

In still another aspect of the invention, a method of managing current in an electronic device coupled to a current source through a current converter including converter information is disclosed. The converter information is read from the current converter. Whether the current converter should be used with the electronic device is determined from the converter information. When the converter information indicates that the current converter should not be used with the electronic device, one of preventing current flow to the electronic device and limiting current flow to the electronic device is performed.

BRIEF DESCRIPTION OF THE DRAWINGS

The present invention may be better understood, and its numerous objects, features, and advantages made apparent to those skilled in the art by referencing the accompanying drawing.

DETAILED DESCRIPTION

Figure 1:
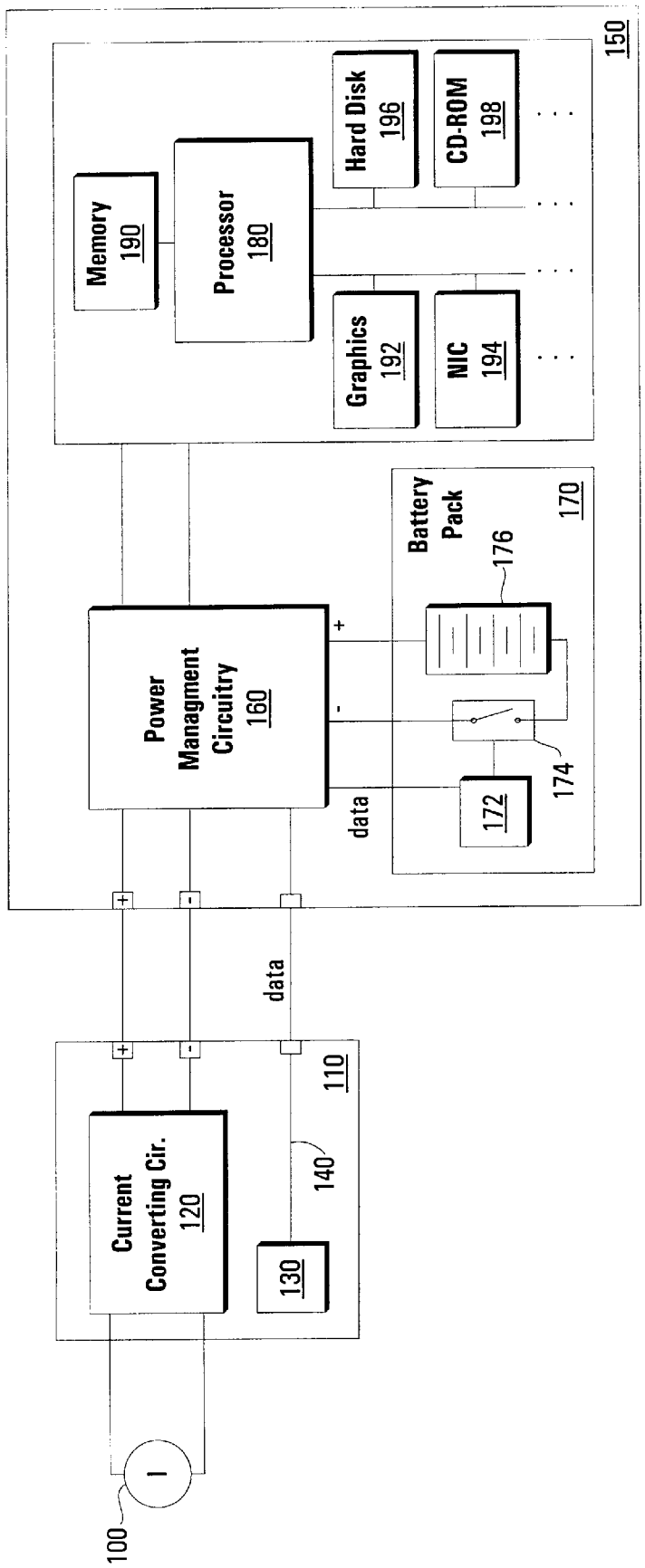
FIG. 1 illustrates a computer system coupled to a power source through a current converter.

FIG. 1 illustrates a computer system 150 (e.g., a portable computer system) that includes a processor 180, a memory 190 coupled to the processor, and a variety of additional components coupled to the processor such as graphics adapter 192, network interface card (NIC) 194, hard disk drive 196, and CD-ROM 198. As demonstrated by the ellipses shown in the FIGURE, the computer system can include a variety of other components (e.g., storage devices, communications devices, input devices and output devices) as is well known to those having ordinary skill in the art.

The majority of the computer system's components receives electrical current through the power management circuitry 160. The power management circuitry can include a DC to DC regulator for providing various system components, for example processor 180, with the specific DC voltage they need. In some computer systems, the power management circuitry can include an AC to DC adapter so that an external AC adapter is not needed. A simple example of power management circuitry 160 includes a circuit capable of reading converter information from current converter 110 and a controller (e.g., a keyboard controller) coupled to the reading circuit and capable of blocking power or allowing power to the rest of the system.

Power management circuitry 160 can also include circuitry for monitoring and controlling power use depending on device activity in the computer system. This can also be accomplished by power management circuitry 160 with logic implementing various power management standards such as the Advanced Power Management (APM) Specification described in the Advanced Power Management (APM) BIOS Interface Specification, Revision 1.2, dated February, 1996, and the Advanced Configuration and Power Interface (ACPI) standard described in the Advanced Configuration and Power Interface Specification, Revision 1.0, dated Dec. 22, 1996.

In computer systems that include a rechargeable battery pack, such as battery pack 170, the power management circuitry can also include battery charging circuits, and logic to monitor and control the battery, such as a microcontroller. In more sophisticated systems, for example those described in the Smart Battery System Specifications, Revision 1.0, dated Feb. 15, 1995, power management circuitry 160 can include a system host controller that communicates with various "smart" devices including smart batteries and smart chargers. Moreover, charging circuits used in power management circuitry 160 can be based on conventional designs or implement more sophisticated designs such as the adaptive charger described in U.S. Pat. No. 5,698,964, entitled Adaptive Power Battery Charging Apparatus, filed by Barry K. Kates and Edward P. Sheehan, Jr., on Oct. 20, 1995, which is incorporated herein by reference. The adaptive batter charger described in U.S. Pat. No. 5,698,964, monitors power provided to the computer system and adaptively utilizes all available power for charging the batteries, both when the computer system is in use, and when the computer system is not in use.

Battery pack 170 is coupled to power management circuitry 160 to send and receive current so as to supply power to the computer system and to receive power (e.g., when charging) from an external power source. Battery pack 170 includes a rechargeable battery 176, a switching circuit 174, and a controller 172. The rechargeable battery can be based on a variety of different rechargeable battery chemistries, such as nickel cadmium (NiCad), nickel-metal hydride (NiMH), lithium ion (Li-ion) and lithium-polymer (Li-polymer). Switching circuit 174 is illustrated as a simple switch controlled by controller 172, but can include a variety of switching circuits, battery pack monitoring circuits, and safety circuits. Controller 172, e.g., a microcontroller or an embedded processor, monitors battery pack 170, controls some or all of the battery pack's circuits, and communicates with power management circuitry 160 over a data line. For example, controller 172 can monitor a circuit (not shown) that measures the charge level of battery 176, and when the controller determines that battery 176 requires recharging, it requests that power management circuitry 160 charge battery 176, or at least allow the battery to be charged.

Power management circuit 160 is coupled through current input terminals and a data input terminal to current converter 110. Current converter 110 includes converting circuit 120 coupled to current input terminals and current output terminals, and converter information storage device 130 coupled to a data output terminal through data bus 140. Converting circuit 120 is coupled to a current source 100, from which converter 110 receives power that it in turn supplies to computer system 150.

Current source 100 can be a conventional AC wall source; a DC source such as is often supplied in an automobile, aircraft, boat, or recreational vehicle; or any other AC or DC source. Of course, the type of source will, at least in some part, determine the type of current converting circuitry. For example, if current source 100 is an AC wall outlet and DC current is required as input into computer system 150, current converting circuitry 120 will likely include a transformer and a rectifier. If current source 100 is a DC source, and computer system 150 includes a built in AC to DC converter, converter 110 must serve as a DC to AC converter, and thus converting circuitry 120 would include a DC to AC inverter. Those having ordinary skill in the art will readily recognize that depending upon the type of current source 100 and the power requirements of computer system 150, a variety of different current converting circuits 120 can be implemented.

Converter information storage device 130 contains information about the current converter such as identity information (e.g., type of converter, manufacturer of converter), voltage capability information, current capability information, and current source information. Converter information storage device 130 can be any type of suitable memory device, including volatile (e.g., RAM) and non-volatile memories (e.g., magnetic memory, flash memory, ROM, and EEPROM). Alternatively, converter information storage device 130 can be a memory within another circuit such as a microcontroller, embedded processor, or application specific integrated circuit (ASIC). If converter information storage device 130 is a controller or if converter 110 includes a controller, current converter 110 can be implemented as a "smart" device much like the smart batteries and smart chargers described by the Smart Battery System Specifications referenced above.

Data from and/or to converter information storage device 130 is transferred to a data output terminal through data bus 140, which can be a single or multi-wired bus, and either uni-directional or bi-directional. Additionally, data bus 140 and communication on the bus can be based on an established standard, such as the integrated circuit ($I^2C$) bus developed by Phillips Semiconductors. Converter 110 can also include a data input terminal to receive information from the current source. In such an example, converter 110 could simply pass the information through to an electronic device such as computer system 150, provide the data from the current source along with converter information, or even process the source information on board the converter so as to prevent or control current flow to the electronic device. Although data bus 140, its associated output terminal, and the corresponding input terminal and circuitry in computer system 150 are shown as being separate from the current supplying lines, schemes can be used to include data transport on the current supplying lines, thereby eliminating the need for one or more extra connections between converter 110 and computer system 150. An example of a system for communicating over power lines is described in U.S. Pat. No. 4,815,106, entitled Power Line Communication Apparatus, filed by Michael B. Propp and David L. Propp, on Apr. 16, 1986.

In operation, power management circuitry 160 receives converter information (e.g., in response to a request by the power management circuitry, by reading the information directly, or by an unprompted transmission from converter 110) and determines if the converter can and/or should be used with computer system 150. To accomplish this, power management circuitry 160 can compare converter identity information with a look-up table, evaluate converter current and voltage characteristics to determine if the converter is suitable for the computer system, or use some other information from the current converter, or even from current source 100. Based on the determination, power management circuitry 160 can allow normal use, can prevent use of the converter and notify the user (e.g., a warning light on the converter the computer system), or can allow restricted use of the current source. For example, if the current source is a DC outlet in an aircraft, converter 110's converter information would include identity information such that power management circuitry 160 could determine that the current source is an aircraft. Under those circumstances, the power management circuitry might prevent the charging of the battery pack for safety reasons. In another example, a power management circuit that receives current and voltage characteristics from the converter, could provide the information to an adaptive charging circuit so that efficient power use by a computer system and charging of a battery could occur simultaneously.

Those having ordinary skill in the art will readily recognize that a variety of power control and management features could be implemented based upon information supplied by a current converter. Additionally, power management circuitry 160 need not be the one or only element of computer system 150 that utilizes converter information. Controller 172 of battery pack 170 can use converter information directly, or as processed by power management circuitry 160. This is particularly the case when the battery pack is smart device. Moreover, processor 180 can utilize converter information for computer system purposes.

Although the discussion above has emphasized the converter's use in conjunction with a computer system, any electronic device that can use current from an external source, including palmtop computers, PDAs, cellular telephones, and camcorders could make use of and benefit from the converter described and associated system elements to take advantage of the converter information.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A current converter comprising:
   a current input terminal;
   a current output terminal;
   a current converting circuit coupled to the current input terminal and the current output terminal;
   a converter information storage device including at least one of current converter identity information, voltage capability information, current capability information, and current source information; and
   a data bus coupled to the storage device, and operable to provide converter information stored in the converter information storage device.

2. The current converter of claim 1 wherein the current converting circuit is one of an alternating current (AC) to AC converting circuit, an AC to direct current (DC) converting circuit, a DC to DC converting circuit, and a DC to AC converting circuit.

3. The current converter of claim 1 wherein the converter information storage device is a non-volatile memory.

4. The current converter of claim 1 further comprising a data output terminal coupled to the data bus.

5. The current converter of claim 1 further comprising a data output terminal coupled to the current output terminal.

6. The current converter of claim 1 wherein the data bus is coupled to one of:
   a data input terminal; and
   the current input terminal.

7. The current converter of claim 1 further comprising a processor coupled to the converter information storage device and the data bus, the processor operable to transmit converter information on the data bus.

8. The current converter of claim 1 further comprising a processor coupled to the data bus, the processor including the converter information storage device, and the processor operable to transmit converter information on the data bus.

9. The current converter of claim 1 wherein the data bus is one of a uni-directional and a bidirectional bus.

10. The current converter of claim 1 wherein the data bus is one of a single-wire and a multi-wire bus.

11. A computer system comprising:
   a processor;
   a memory coupled to the processor; and
   power management circuitry coupled to the processor and memory, and operable to supply power to the processor and memory, the power management circuitry including:
      a current input terminal;
      a controller operable to receive current converter information including at least one of current converter identity information, voltage capability information, current capability information, and current source information from a current converter, the controller selectively enabling the power management circuitry to deliver power to the processor and memory depending upon the current converter information.

12. The computer system of claim 11 further comprising a rechargeable battery, the power management circuitry including a charging circuit coupled to the battery.

13. The computer system of claim 12 wherein the controller prevents charging of the battery with the charging circuit depending on the current converter information.

14. The computer system of claim 12 wherein the controller limits charging of the battery with the charging circuit depending on the current converter information.

15. The computer system of claim 12 wherein the rechargeable battery is coupled into a rechargeable battery pack including a battery controller, the battery controller coupled to the power management circuitry, and operable to control charging of the rechargeable battery depending on the current converter information.

16. The computer system of claim 11 wherein the controller is coupled to the current input terminal and is operable to receive current converter information through the current input terminal.

17. The computer system of claim 16 further comprising a current converter coupled to the current input terminal of the power management circuitry.

18. The computer system of claim 17 wherein the current converter includes one of an alternating current (AC) to AC converting circuit, an AC to direct current (DC) converting circuit, a DC to DC converting circuit, and a DC to AC converting circuit.

19. The computer system of claim 11 wherein the controller is coupled to a data input terminal operable to receive current converter information.

20. The computer system of claim 19 further comprising a data bus coupled between the data input terminal and the controller, the data bus being one of a uni-directional and a bidirectional bus.

21. The computer system of claim 20 wherein the data bus is one of a single-wire and a multi-wire bus.

22. The computer system of claim 19 further comprising a current converter coupled to the current input terminal of the power management circuitry and to the data input terminal.

23. The computer system of claim 22 wherein the current converter includes one of an alternating current (AC) to AC converting circuit, an AC to direct current (DC) converting circuit, a DC to DC converting circuit, and a DC to AC converting circuit.

24. A method of managing current in an electronic device coupled to a current source through a current converter including converter information, the converter information including at least one of current converter identity information, voltage capability information, current capability information, and current source information, the method comprising:
   reading the converter information from the current converter;
   determining from the converter information whether the current converter should be used with the electronic device; and
   performing one of preventing current flow to the electronic device and limiting current flow to the electronic device when the converter information indicates that the current converter should not be used with the electronic device.

25. The method of claim 24 further comprising performing one of allowing current flow to the electronic device and limiting current flow to the electronic device when the converter information indicates that the current converter should be used with the electronic device.

26. The method of claim 24 wherein the electronic device includes a rechargeable battery and a charging circuit coupled to the rechargeable battery, the method further comprising:
   determining from the converter information whether the battery should be allowed to charge; and
   preventing the battery from being charged by the charging circuit when the converter information indicates that the battery should not be charged.

27. The method of claim 24 wherein the electronic device includes a rechargeable battery and an adaptive charging circuit coupled to the rechargeable battery, the method further comprising:
   determining from the converter information whether the battery should be allowed to charge;
   determining from the converter information available current; and
   adaptively utilizing substantially all available current for the adaptive charging circuit both when the electronic device is in use and when it is not in use.

* * * * *

UNITED STATES PATENT AND TRADEMARK OFFICE
CERTIFICATE OF CORRECTION

PATENT NO. : 6,058,034
DATED : May 2, 2000
INVENTOR(S) : Cummings, John A.; Kates, Barry K.

It is certified that error appears in the above-identified patent and that said Letters Patent is hereby corrected as shown below:

Please correct the Title page of the above-identified U.S. Letters Patent in Section 76 to read:

[76] Inventors: John A. Cummings, Round Rock, Tex.
Barry K. Kates, Austin, Tex.

add the Assignee which should read:

Assignee: Dell USA, L. P., Round Rock, Tex.

after Section [56] add the Attorney, Agent or Firm name which should read:

*Attorney, Agent, or Firm*—Skjerven, Morrill, MacPherson LLP

Signed and Sealed this

First Day of May, 2001

*Attest:*

NICHOLAS P. GODICI

*Attesting Officer*   *Acting Director of the United States Patent and Trademark Office*

UNITED STATES PATENT AND TRADEMARK OFFICE
CERTIFICATE OF CORRECTION

PATENT NO. : 6,058,034
DATED : May 2, 2000
INVENTOR(S) : Cummings et al.

Page 1 of 1

It is certified that error appears in the above-identified patent and that said Letters Patent is hereby corrected as shown below:

<u>Title page,</u>
Item [76], Inventors, should read:

-- [76] Inventors: John A. Cummings, Round Rock, Tex.
              Barry K. Kates, Austin, Tex. --
Insert Item [73], Assignee name as follows:

-- [73] Assignee: Dell USA L.P., Round Rock, Texas --
Item [74], *Attorney Agent, or Firm*, should read:

-- [74] *Attorney, Agent, or Firm*—Skjerven, Morrill, MacPherson LLP --

Signed and Sealed this

Twenty-first Day of December, 2004

JON W. DUDAS
*Director of the United States Patent and Trademark Office*